US009420359B2

(12) United States Patent
Cvijetic et al.

(10) Patent No.: US 9,420,359 B2
(45) Date of Patent: Aug. 16, 2016

(54) DYNAMIC WAVELENGTH VIRTUALIZATION AND/OR ON-DEMAND FLOW PROVISIONING IN OPTICAL NETWORKS

(71) Applicant: NEC Laboratories America, Inc., Princeton, NJ (US)

(72) Inventors: Neda Cvijetic, Plainsboro, NJ (US); Philip Nan Ji, Cranbury, NJ (US); Ting Wang, West Windsor, NJ (US); Akihiro Tanaka, Plainsboro, NJ (US)

(73) Assignee: NEC Corporation (JP)

( * ) Notice: Subject to any disclaimer, the term of this patent is extended or adjusted under 35 U.S.C. 154(b) by 126 days.

(21) Appl. No.: 14/184,787

(22) Filed: Feb. 20, 2014

(65) Prior Publication Data

US 2014/0241717 A1    Aug. 28, 2014

Related U.S. Application Data

(60) Provisional application No. 61/767,896, filed on Feb. 22, 2013.

(51) Int. Cl.
*H04Q 11/00*  (2006.01)
*H04J 14/02*  (2006.01)

(52) U.S. Cl.
CPC ........ *H04Q 11/0067* (2013.01); *H04J 14/0224* (2013.01); *H04J 14/0267* (2013.01); *H04Q 2011/0086* (2013.01)

(58) Field of Classification Search
None
See application file for complete search history.

(56) References Cited

U.S. PATENT DOCUMENTS

| | | | | |
|---|---|---|---|---|
| 6,981,228 | B1* | 12/2005 | Chen | H04L 41/12 398/17 |
| 8,320,760 | B1* | 11/2012 | Lam et al. | 398/66 |
| 2008/0298805 | A1* | 12/2008 | Lee et al. | 398/48 |
| 2010/0040366 | A1* | 2/2010 | Jenkins et al. | 398/34 |
| 2012/0170937 | A1* | 7/2012 | Van Leeuwen | 398/76 |
| 2013/0308951 | A1* | 11/2013 | Blumenthal et al. | 398/83 |
| 2014/0205281 | A1* | 7/2014 | Sone et al. | 398/25 |
| 2014/0219661 | A1* | 8/2014 | Doo et al. | 398/68 |
| 2014/0363163 | A1* | 12/2014 | Morper et al. | 398/58 |

OTHER PUBLICATIONS

Ma et al. (Applying OOK modulation to reduce the inter-carrier interference in OFDM, 2007).*
Zhang et al. (Experimental demonstration of OpenFlow-based control plane for elastic lightpath provisioning in Flexi-Grid optical networks, Jan. 28, 2013 / vol. 21, No. 2 / Optics Express).*

(Continued)

*Primary Examiner* — Shi K Li
*Assistant Examiner* — Mina Shalaby
(74) *Attorney, Agent, or Firm* — Joseph Kolodka

(57) ABSTRACT

A network apparatus used in an optical network is disclosed. The network apparatus includes one or more first tunable and temperature controlled (TTC) lasers, one or more transmitters each of which is connected to one of said one or more TTC lasers, one or more second TTC lasers, one or more digital signal processing (DSP) transponders (TPNDs) each of which is connected to one of said one or more second TTC lasers, one or more receivers, and a controller to control said one or more transmitters and said one or more DSP TPNDs, wherein said one or more transmitters defragment an optical access spectrum, and said one or more DSP TPNDs exploit a newly available spectrum. Other apparatuses, systems, and methods also are disclosed.

17 Claims, 15 Drawing Sheets

(56) References Cited

OTHER PUBLICATIONS

Open Networking Foundation (OpenFlow Switch Specification, Version 1.3.0).*

A. Tajima, H. Yanagisawa, and S. Takahasi, "Next Generation Optical Access Network: Standardization Outline and Key Technologies for Co-existence with Legacy Systems," IEICE Trans. Electron., vol. E93-C, No. 7, pp. 1146-1151, Jul. 2010.

Y. Ma, Y. Qian, G. Peng, X. Zhou, X. Wang, J. Yu, Y. Luo, X. Yan, and F. Effenberger, "Demonstration of a 40Gb/s Time and Wavelength Division Multiplexed Passive Optical Network Prototype System," Proc. OFC 2012, paper PDP5D.7.

FSAN: http://www.fsan.org/news/.

N. Yoshimoto, "Next-Generation Access for Mobile Backhaul Application," Proc. the 17th OptoElectronics and Communications Conference (OECC 2012), paper 6A1-1.

N. Cvijetic, A. Tanaka, M. Cvijetic, Yue-Kai Huang, E. Ip, Y. Shao, and T. Wang, "Novel Optical Access and Digital Processing Architectures for Future Mobile Backhaul," J. Lightwave Technol., vol. 31, No. 4, pp. 621-627, Feb. 2013.

OpenFlow 1.0 specification, available at www.openflow.org.

K. Kanonakis, N. Cvijetic, I. Tomkos, and Ting Wang, "A Novel Energy and Delay Efficient OFDMA 'Meta-MAC' Scheme for Heterogeneous PON Coexistence," Proc. the 17th OptoElectronics and Communications Conference (OECC 2012), paper 4A4-5.

D. Lavery, R. Maher, D. S. Millar, B. C. Thomsen, P. Bayvel, and S. J. Savory, "Demonstration of 10 Gbit/s Colorless Coherent PON Incorporating Tunable DS-DBR Lasers and Low-Complexity Parallel DSP," Proc. the Optical Fiber Communication Conference and Exposition (OFC) 2012, paper PDP5B.10.

Ke Wen et al. "Adaptive Spectrum Control and Management in Elastic Optical Networks", IEEE Journal on Selected Areas in Communications. Jan. 2013. vol. 31, No. 1, pp. 39-48 See pp. 40-41, 43, 45.

* cited by examiner

DYNAMIC WAVELENGTH VIRTUALIZATION AND/OR ON-DEMAND FLOW PROVISIONING IN OPTICAL NETWORKS

This application claims the benefit of U.S. Provisional Application No. 61/767,896, entitled "Novel Software-Defined Tunable Optical Line Terminal (OLT) Architecture for Dynamic Wavelength Virtualization and On-Demand Flow Provisioning in Optical Access Networks," filed on Feb. 22, 2013, the contents of which are incorporated herein by reference.

BACKGROUND OF THE INVENTION

The present invention relates to dynamic wavelength virtualization and/or on-demand flow provisioning in an optical network and, more particularly, to optical line terminal (OLT) architecture used in an optical access network.

With the predominance of dynamic traffic in modern networks, bandwidth on-demand rather than aggregate bandwidth has emerged as a key feature for revenue generation (i.e. monetizing the network infrastructure). While this trend applies to all optical networking sectors, the need for rapid service introduction and the fluctuation/unpredictability of traffic patterns are highest in optical access/aggregation networks. However, inefficient use of optical spectrum in existing optical access networks, as well as conflicting requirements between operators, have resulted in a wavelength plan gridlock. This significantly limits the potential for rapid service/innovation introduction that is crucial for monetizing the network, as well as the ability for dynamic traffic engineering/balancing to optimize network performance.

Previously, standardization bodies (e.g. Full Services Access Network, FSAN) have defined fixed wavelength plans with operational wavelength bands that are disproportionately large compared to the service data rate [1]—for example, 5 nm for downstream 10 Gb/s passive optical networks (PON) residential access, and 20 nm for downstream GPON residential service. Moreover, very large spectral guard-bands have also been defined to isolate different types of services [1]—for example, a 10 nm guard-band is defined to separate GPON from RF video services. The reason for the inefficient wavelength planning is that lowcost, non-tunable optical components, including lasers and filters, could be exploited in the network. With increasing optical spectrum congestion, recently tunable optical network unit (ONU)-side devices, including tunable lasers and filters, have been proposed to enable more efficient and flexible spectrum use [2]. However, tunable ONU-side filters, proposed for 40 Gb/s time and wavelength division multiplexed PON (TWDM-PON) within the NG-PON2 FSAN standard [3], are not fully commercially mature and are targeted to operate only over a limited wavelength range (4-8 wavelengths), which limits wavelength assignment flexibility and may not be a convenient operational choice for all operators. Moreover, tunable components increase ONU-side cost, such that on-demand services/bandwidth would be restricted to users with more costly optical hardware. Consequently, this approach would not include users with legacy ONUs who might wish to subscribe to temporary/on-demand high-speed service delivery without upgrading ONU-side optical hardware, and/or to services such as low-cost, on-demand mobile backhaul.

REFERENCES

[1] A. TAJIMA, H. YANAGISAWA, and S. TAKAHASI, "Next Generation Optical Access Network: Standardization Outline and Key Technologies for Co-existence with Legacy Systems," IEICE Trans. Electron., Vol. E93-C, No. 7, pp. 1146-1151, July 2010.

[2] Y. Ma, Y. Qian, G. Peng, X. Zhou, X. Wang, J. Yu, Y. Luo, X. Yan, and F. Effenberger, "Demonstration of a 40 Gb/s Time and Wavelength Division Multiplexed Passive Optical Network Prototype System," Proc. OFC 2012, paper PDP5D.7.

[3] FSAN: http.//www.fsan.org/news/

[4] N. Yoshimoto, "Next-Generation Access for Mobile Backhaul Application," Proc. The 17th OptoElectronics and Communications Conference (OECC 2012), paper 6A1-1.

[5] N. Cvijetic, A. Tanaka, M. Cvijetic, Yue-Kai Huang, E. Ip, Y. Shao, and T. Wang, "Novel Optical Access and Digital Processing Architectures for Future Mobile Backhaul," J. Lightwave Technol., vol. 31, No. 4, pp. 621-627, February 2013.

[6] OpenFlow 1.0 specification, available at www.openflow.org.

[7] K. Kanonakis, N. Cvijetic, I. Tomkos, and Ting Wang, "A Novel Energy and Delay Efficient OFDMA 'Meta-MAC' Scheme for Heterogeneous PON Coexistence," Proc. The 17th OptoElectronics and Communications Conference (OECC 2012), paper 4A4-5.

[8] D. Lavery, R. Maher, D. S. Millar, B. C. Thomsen, P. Bayvel, and S. J. Savory, "Demonstration of 10 Gbit/s Colorless Coherent PON Incorporating Tunable DS-DBR Lasers and Low-Complexity Parallel DSP," Proc. The Optical Fiber Communication Conference and Exposition (OFC) 2012, paper PDP5B.10.

BRIEF SUMMARY OF THE INVENTION

An objective of the present invention is to efficiently use optical spectrum in an optical access network.

An aspect of the present invention includes a network apparatus used in an optical network. The network apparatus comprises one or more first tunable and temperature controlled (TTC) lasers, one or more transmitters each of which is connected to one of said one or more TTC lasers, one or more second TTC lasers, one or more digital signal processing (DSP) transponders (TPNDs) each of which is connected to one of said one or more second TTC lasers, one or more receivers, and a controller to control said one or more transmitters and said one or more DSP TPNDs, wherein said one or more transmitters defragment an optical access spectrum, and said one or more DSP TPNDs exploit a newly available spectrum.

Another aspect of the present invention includes a method used in an optical network. The method comprises controlling one or more transmitters each of which is connected to a first tunable and temperature controlled (TTC) laser and one or more digital signal processing (DSP) transponders (TPNDs) each of which is connected to a second TTC laser, wherein said one or more transmitters defragment an optical access spectrum, and said one or more DSP TPNDs exploit a newly available spectrum.

Still another aspect of the present invention includes an optical network comprising a network apparatus, an optical network unit connected to the network apparatus through an optical fiber, wherein the network apparatus comprises one or more first tunable and temperature controlled (TTC) lasers, one or more transmitters each of which is connected to one of said one or more TTC lasers, one or more second TTC lasers, one or more digital signal processing (DSP) transponders (TPNDs) each of which is connected to one of said one or more second TTC lasers, one or more receivers, and a controller to control said one or more transmitters and said one or more DSP TPNDs, wherein said one or more transmitters defragment an optical access spectrum, and said one or more DSP TPNDs exploit a newly available spectrum.

BRIEF DESCRIPTION OF THE DRAWINGS

FIGS. 5(d) and (e) depict an example of 0.01 nm resolution. FIG. 5(g) depicts an example of 0.05 nm resolution. XML=extensible markup language; Enc.=encoder; TOF=tunable optical filter; OC=optical coupler; Dec.=decoder.

DETAILED DESCRIPTION

Figure 1:
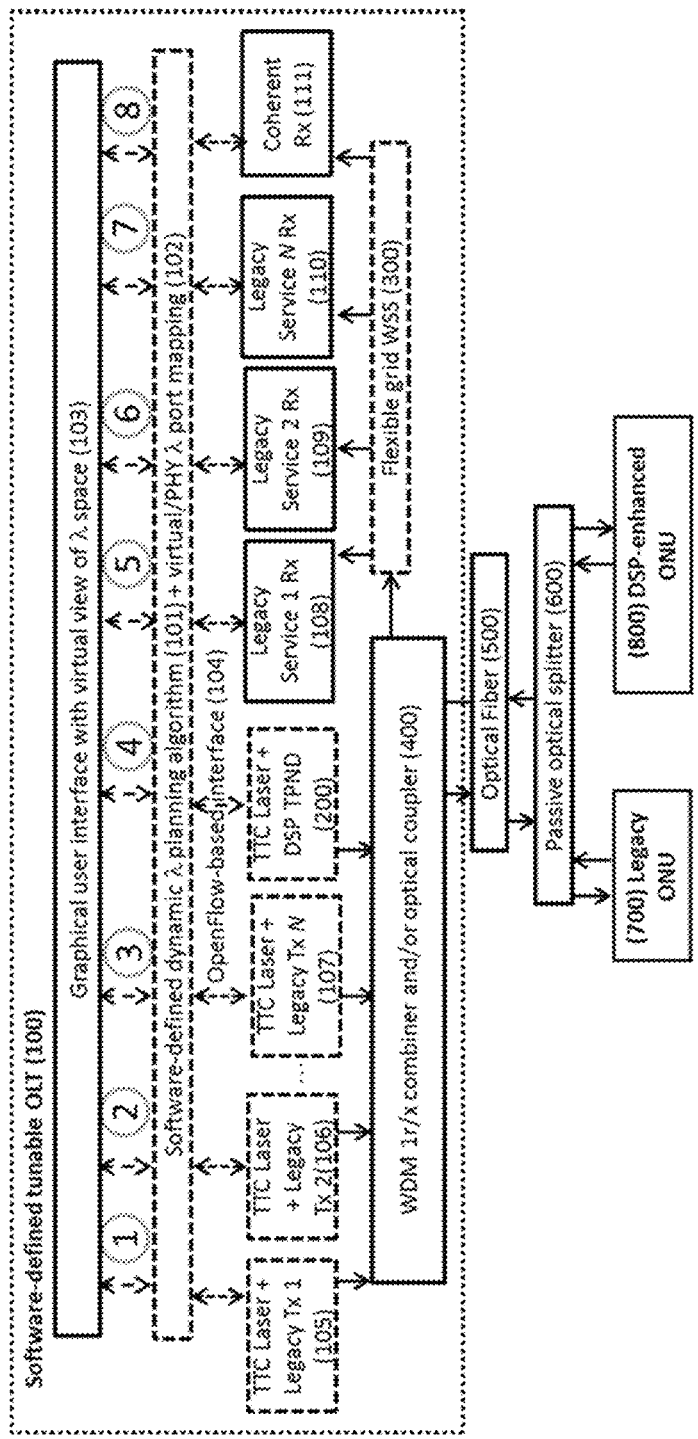
FIG. 1 depicts a software-defined tunable OLT architecture for dynamic wavelength ($\lambda$) virtualization and on-demand service introduction; TTC=tunable and temperature controlled; Tx=transmitter; TPND=transponder; Rx=receiver; WDM=wavelength division multiplexing; WSS=wavelength selective switch.

Unlike in previous work, the problem is solved neither by defining a fixed wavelength plan for new services (as in previous standardization work [1]), nor by seeking to enable limited wavelength flexibility through tunable ONU-side hardware (as in TWDM-PON or several variants of wavelength division multiplexed (WDM)-based PON for NG-PON2 [4]). Rather, extensive wavelength flexibility is enabled by: 1.) cost-efficient digital signal processing (DSP) enhanced ONUs in combination with legacy optical components, and 2.) tunable optical line terminal (OLT)-side components—specifically, tunable narrow linewidth lasers and flexible grid wavelength selective switches (WSS)—which are centralized at the OLT such that their cost can be amortized over the large number of ONUs and services they support. Moreover, rather than defining fixed physical wavelength plan as has been done previously [1], flexible virtualized wavelength planning is adopted at the OLT using software-defined algorithms and, for example, generic OpenFlow-based control messaging. In this way, each operator can define a customized, software-reconfigurable wavelength plan for their network, enabling flexible, operator-specific network monetization while avoiding standardization gridlock which can occur in seeking to define a one-size-fits all wavelength plan.

By exploiting centralized, software-defined wavelength management, the solution offers a generic, abstracted wavelength space view to external parties, enabling secure, multi-operator interoperability and rapid service introduction without physical wavelength plan standardization gridlock that can significantly delay new service introduction and limit revenue growth. Moreover, the tunable optical components that enable extensive wavelength flexibility are centralized at the OLT, rather than distributed at the ONUs, such that their cost can be amortized over a large number of ONUs and services. Finally, by centralizing both the tunable components and the software-reconfigurable wavelength control algorithms at the OLT, on-demand services/bandwidth can be made available to legacy users through cost-efficient DSP-based ONU enhancements and without requiring more costly ONU-side optical hardware upgrades. In this way, a novel and attractive business model to monetize the underlying network by dynamically and cost-efficiently satisfying user-side requirements can be created.

Solutions are: 1.) the upgrades of OLT-side legacy transmitters (105)-(107) to operate using tunable, temperature controlled lasers, which enables the defragmentation of optical access spectrum and increased spectral availability for new services; 2.) the introduction of the OLT-side DSP TPND (200), which in conjunction the tunable, temperature-stabilized laser can exploit the newly-available spectral space and advanced DSP-based modulation to rapidly introduce beyond 10 Gb/s/wavelength data flows into the network; 3.) the dynamic wavelength assignment algorithm (101) and wavelength virtualization map (102), which enable a global logical view of the underlying physical spectrum space, such that a single physical standardized wavelength plan is no longer necessary to enable operator interoperability and new service introduction; 4.) DSP-enhanced ONUs (800) which exploit broadband direct photodetection (801) and frequency domain DSP (802) to isolate the downstream signal of the new services without legacy service signal interference; and/or 5.) a software-controlled flexible-grid OLT-side WSS (300) which creates multiple signal pass-bands with variable center frequencies and variable pass-band sizes to enable wavelength-tunable upstream signal separation.

A software-defined (SD) tunable OLT architecture (100) supporting bi-directional communication with both legacy ONUs (700) and DSP-enhanced ONUs (800) is shown in FIG. 1. It is noted that in FIG. 1, functional blocks (101)-(103), (400), (500), (600), (700), and (800) are exploited for both downstream (DS) and upstream (US) operation, functional blocks (105)-(200), are used for DS operation only, and blocks (108)-(111), and (300) are exploited for US operation only.

As shown in FIG. 1, unlike in legacy networks where wavelength DS/US assignment is fixed, in the SD tunable OLT (100), wavelengths are allocated and managed dynamically using the SD dynamic $\lambda$ planning algorithm (101) and physical-to-virtual $\lambda$-port mapping (102). Specifically, whereas in core optical networks a SD controller has a global view of the switches and routers in the network topology and computes optimal flow paths, in (100), the $\lambda$ planning algorithm (101) has a global view of the physical wavelength space and computes $\lambda$ assignment metrics and according to a set of operator-specific criteria. Consequently, the $\lambda$ assignment metrics and the wavelengths that correspond to the optimal allocation scheme of (101) could vary greatly depending on the specific operator needs and requirements. The algorithm of (101) could thus range from a highly-sophisticated optimization algorithm for maximized spectral efficiency (for example, the "meta-MAC" [2]), to a simpler algorithm that identifies wavelength regions that meet a certain performance criterion (e.g. carrier-to-noise ratio or relative intensity noise requirements), to a basic heuristic that populates an ITU-T standardized wavelength grid. It is noted that the need for backwards compatibility with legacy services (105)-(107) can a priori restrict the usage of some sub-set of wavelengths (e.g. GPON, 10 G-PON, RF video, etc.), such that these restrictions would be communicated by legacy service Tx hardware (105)-(107) to (101) via a generic interface (104), such as OpenFlow, for example.

With the novel exploitation of OLT-side tunable and temperature-controlled narrow lasers in (105)-(107), however, the sub-set of restricted wavelengths for (105)-(107) can be greatly reduced compared to legacy wavelength band operational requirements for legacy services. Moreover, regardless of the algorithm choice in (101), its decisions are ultimately abstracted to a virtualized (i.e. logical) view of the wavelength space by the PHY-to-virtual λ mapping (102) and made available in virtualized form to a centralized graphical user interface (103), which provides a global logical view of the underlying physical wavelength space resources. In FIG. 1, for example, instead of providing the exact physical description (e.g. 1550.15 nm, 1317.8 nm) of each of the 8 available wavelengths (4 DS, 4 US), the PHY-to-virtual mapping (102) provides a single virtual λ-port number (1-8) to the graphical user interface (103). By thus exploiting (101)-(103), sufficient physical resources can be made available for either internal or third-party service flow provisioning while abstracting the detailed physical-layer implementation of the on-demand service support.

Figure 2:
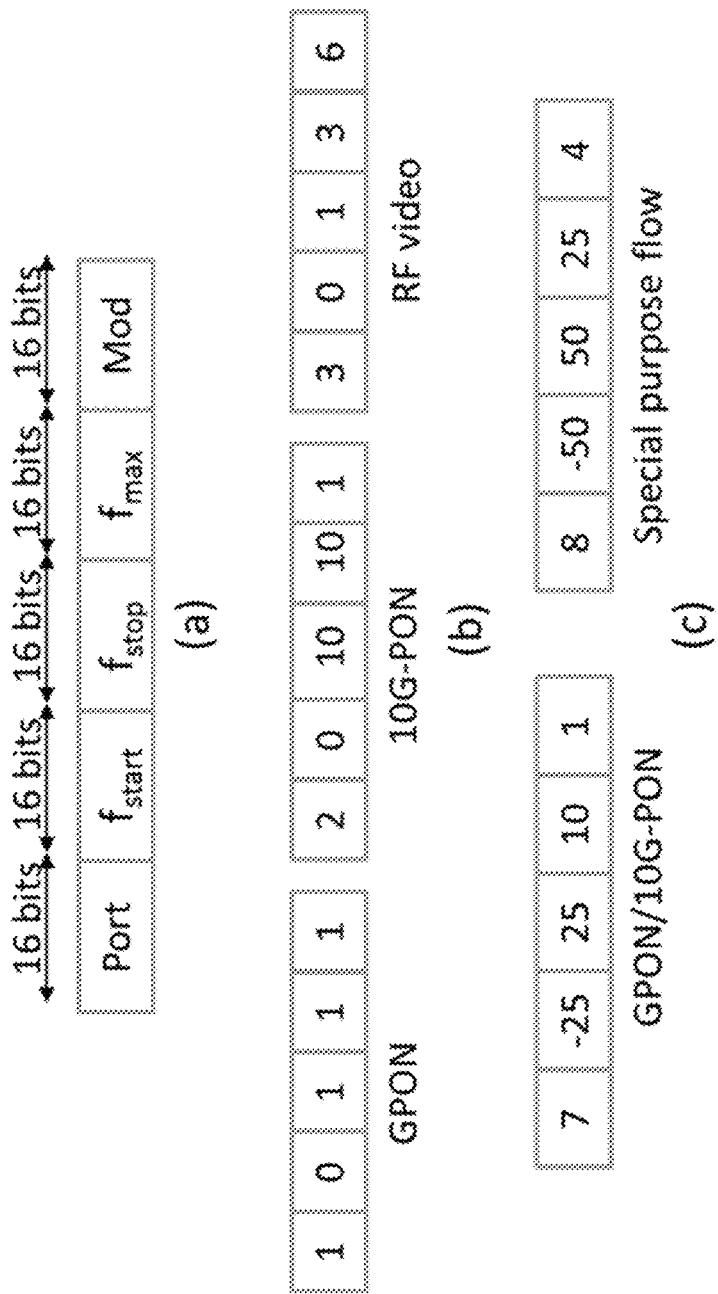
FIG. 2 depicts a detailed view of PHY-to-virtual $\lambda$ mapping (102).

The detailed view of the PHY-to-virtual λ mapping (102) is shown in FIG. 2(a), and comprises five 16-bit fields which are compatible with OpenFlow-based control signaling. For downstream PHY-to-virtual λ mapping, the port field directly assigns a 16-bit numerical label to an underlying optical wavelength, while the next three fields—i.e. $f_{start}$, $f_{stop}$, and $f_{max}$—denote the sub-λ operational frequencies of the downstream signal. The fifth field denotes the modulation format of the downstream signal. To illustrate the downstream operation of the PHY-to-virtual mapping (102) of FIG. 2(a), three examples are given in FIG. 2(b) for: a 0-1 GHz binary modulation GPON signal on λ port 1 (e.g. 1490 nm); a 0-10 GHz binary modulation 10 GPON signal on λ port 2 (e.g. 1490.5 nm); and a 0-1 GHz RF video signal on λ port 3 (e.g. 1551 nm) with $M=2^6=64$ QAM modulation and the physical-layer capability to extend to a 3 GHz maximum sub-λ PHY bandwidth. It is noted that the OLT-side physical-layer capability for allocating arbitrary downstream wavelengths with minimal guard-bands to different services is enabled by temperature-stabilized tunable lasers DSP TPND (200) as well as the WDM 1r/x coupler (400).

To illustrate the upstream operation of the PHY-to-virtual mapping (102) of FIG. 2(a), two examples are given in FIG. 2(c) for: a dual-rate, binary-modulated GPON/10 G-PON upstream signal with 10 GHz physical bandwidth for which a 50 GHz slot centered at λ port 7 (e.g. 1262 nm) is created; and a special purpose data flow with 25 GHz physical bandwidth and $M=2^4=16$ QAM modulation for which a 100 GHz slot centered at λ port 8 (e.g. 1579 nm) is created using software-defined control of the flexible grid WSS (300). It is noted that the $f_{max}$ parameter is communicated to the λ planning and virtual mapping algorithms (101) and (102) by the ONU-side hardware, while the $f_{start}$, $f_{stop}$, Port, and Mod parameters in FIG. 2(a) are decided by the λ planning algorithm (101) and communicated to the ONU-side hardware by the virtual λ map (102) control messaging.

As shown in FIG. 1, after the PHY-to-virtual λ assignment and mapping and optical signal generation and modulation using the legacy and DSP transmitters (105)-(107) and (200), the complete set of DS wavelengths is combined using existing WDM, WDM 1r/1x combiners and/or passive optical couplers (400) for distribution of the optical fiber link (500), which is terminated with passive optical splitters (600).

Figure 3:
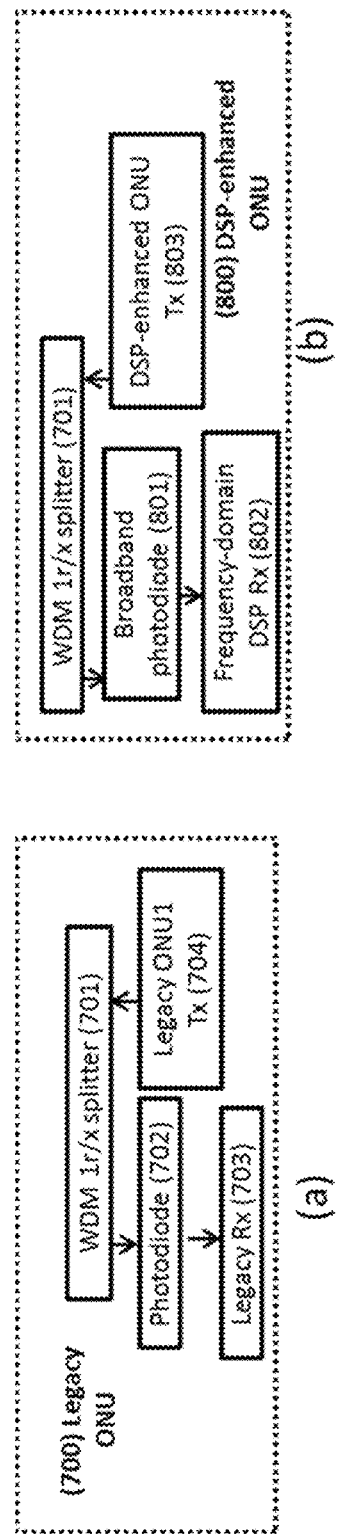
FIG. 3 depicts a detailed comparative view of: (a, left) legacy ONU (700) and (b, right) DSP-enhanced ONU (800).

As shown in FIG. 1, and in more detail in FIG. 3, at the ONU side (700) and (800), legacy ONU-side WDM 1r/1x filters (701) can be used for wavelength-based separation of legacy and new services, leaving downstream legacy ONU operation (700) unchanged. Moreover, even in the absence of the ONU-side WDM 1r/1x filters (701), so long as the sub-λ operational signal frequencies $f_{start}$, $f_{stop}$, and $f_{max}$ generated by the DSP transponder (200) and intended for DSP-enhanced ONUs (800) are outside of the sub-λ operational frequencies of the legacy ONU photodiode (702), the legacy ONU (700) optical front end (702) will intrinsically behave as a low-pass filter and remove these without altering its operation or the operation of the post-photodetection legacy Rx (703) in any way. The broadband photodiode (801) of the DSP-enhanced ONU (800), on the other hand, can capture the optical signal of both legacy and emerging services. However, unlike the legacy ONU photodiode (702), which must act as a low-pass filter to maintain sub-λ signal frequency separation between legacy and new services, the frequency-domain DSP-enhanced ONU Rx (802), e.g. based on frequency division multiple access (FDMA)/orthogonal frequency division multiple access (OFDMA), for example, can exploit its DSP capabilities and knowledge of the sub-λ operational signal frequencies $f_{start}$, $f_{stop}$, and $f_{max}$ to isolate its designated signal in post-photodetection DSP, and discard all other frequency content. It is noted that in addition to these differences between the legacy ONU (700) and DSP-enhanced ONU (800) downstream receiveres, it is the software-defined λ assignment algorithm (101), such as the meta-MAC [1], that ensures there will be no sub-λ frequency domain overlap/interference between the signal content of legacy and new service flows.

Finally, DSP-based Tx enhancements (803) can also be exploited for upstream transmission, such that unlike in legacy US Tx hardware (704) for which both US wavelengths and transmission bit rates are fixed and can reach up to 10 Gb/s/λ, multi-level modulation can be implemented in a software-reconfigurable fashion to dynamically support beyond 10 Gb/s/λ bit rate assignments. After upstream transmission through the WDM 1r splitter (701), which is operated as a coupler in upstream mode, followed by the PON passive splitter (600), and optical fiber (500), the flexible-grid WSS (300) is used at the OLT-side to separate the upstream optical signal components (FIG. 1). Specifically, using software-defined control (101)-(103), the WSS is exploited to create multiple signal pass-bands with variable center frequencies and variable pass-band size. At the WSS (300) output, the upstream flows are wavelength separated and independently routed to their designated receivers (108)-(111). For legacy TDM-based services with data rates up to 10 Gb/s/λ, burst-mode optical receivers may be used for (108)-(110), while for beyond 10 Gb/s/λ service flows, coherent detection may be exploited for (111).

Further System Details

We demonstrate the first software-defined OpenFlow1.0-based flex-grid-flow architecture enabling 150 Mb/s per-cell OFDMA MBH overlays onto bidirectional 10 Gb/s PON, without any ONU-side optical filtering, amplification, or coherent detection over 20 km SSMF and 1:64 passive split.

1. Introduction

Flexible, on-demand provisioning of low-latency wavelength flows for high quality of service >100 Mb/s per-cell mobile backhaul (MBH) over legacy passive optical networks (PON) is rapidly becoming a vital technical and economic priority for optical access networks [4, 5]. However, notable spectrum fragmentation and gridlock exist in legacy PONs due to the concatenation of fixed operational and spectral guardbands that are disproportionately large compared to service data rates: 20 nm for 1 Gb/s PON, for example [1]. Localized differences in traffic demands also complicate partitioning of the remaining spectral space into a universal physical λ plan. While optical network unit (ONU)-side optical filters with limited λ tunability and large upstream spectral bands accommodating tunable laser drift seek to alleviate this gridlock [2], further spectrum fragmentation limiting MBH overlays remains a challenge.

With the software defined networking (SDN) approach, however, instead of defining a fixed physical λ plan, software-reconfigurable flex-grid (or grid-less) λ planning can be introduced at the optical line terminal (OLT), by which a centralized controller with a global view of the λ-space can compute customized provisioning metrics on-demand, and communicate them using a generic OpenFlow-based [6] application programming interface (API). The OpenFlow-based API can then both provide external interoperability and flexible, dynamic per-PON physical λ plans. At the OLT, the λ-space virtualization can be supported by widely-tunable DFB lasers, for which C-band cost points nearly equal those of fixed λ lasers, and for the upstream, by flexible-grid filters, i.e. wavelength selective switches (WSS), which can be software-controlled to track upstream signals and relax ONU-side tunable laser requirements while reducing spectral band size. Moreover, at the downstream ONU side, direct photodetection with digital signal processing (DSP)-based sub-λ Orthogonal Frequency Division Multiple Access (OFDMA)-based signal separation can be used for OFDMA MBH/10 G on off keying (OOK) PON coexistence without tunable optical filtering.

2. Proposed OpenFlow-Based Flex-Grid λ-Flow Architecture for OFDMA MBH Over Legacy PON We propose and experimentally demonstrate the first software-defined OpenFlow1.0-based flex-grid λ-flow architecture for 150 Mb/s per-cell OFDMA MBH overlays onto PON comprising bidirectional 10 Gb/s OOK channels, without any ONU-side optical filtering, amplification, or coherent detection over 20 km SSMF and 1:64 passive split. The new approach is attractive for next-generation converged optical access/MBH.

Figure 4:
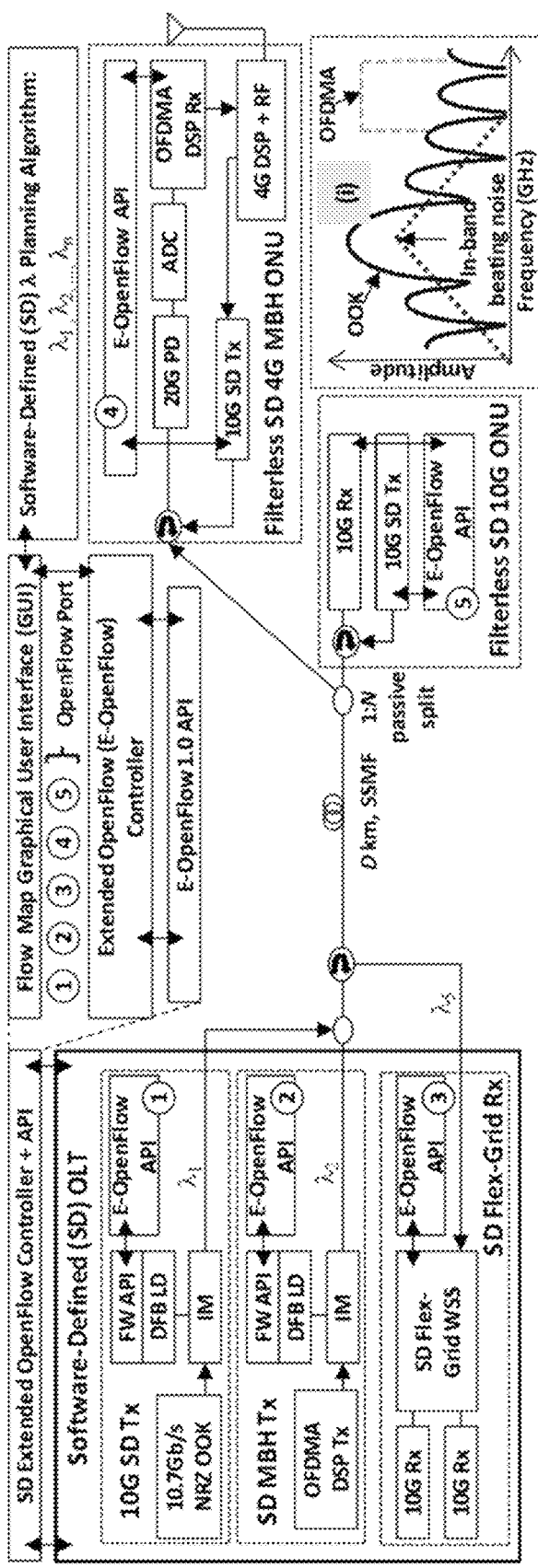
FIG. 4 depicts an OpenFlow-based flex-grid $\lambda$-flow architecture for 4G 150 Mb/s per-cell orthogonal frequency division multiple access (OFDMA) mobile backhaul (MBH) overlays onto legacy PON. Tx=transmitter; FW=firmware; API=application programming interface; Rx=receiver; WSS=wavelength selective switch.

FIG. 4 illustrates the proposed architecture: the software-defined λ-planning algorithm with a global view of the physical wavelength space, $\lambda_1$-$\lambda_n$, computes λ assignment metrics for incoming flows according to customizable rather than fixed criteria. Metrics can thus range from maximized spectral efficiency (e.g. via the "meta-MAC" [7]), to relative intensity noise requirements (for RF video coexistence), to a basic heuristic that populates an ITU-T grid. On the physical layer, dynamic λ assignment is done by tuning the wavelength of OLT-side temperature-controlled DFB lasers in the 10 G SD Tx and MBH SD Tx using an extended OpenFlow API that controls the underlying laser firmware (FW). Physical downstream (DS) and upstream (US) connections can be thus virtualized as logical flows between bidirectional OpenFlow port identifiers (e.g. 1 to 5 in FIG. 4), such that they can be viewed, queried, and modified in software through the flow map graphical user interface (GUI). To create new flows (i.e. add new OpenFlow table entries), the centralized E-OpenFlow controller can exploit the FlowMod( ) command and match the SD λ-planner decisions to the corresponding OpenFlow ports: e.g. match $\lambda_1$ to ports 1 and 5 for DS 10 G OOK transmission, $\lambda_2$ to ports 2 and 4 for DS OFDMA MBH, and $\lambda_5$ to ports 4 and 3 for US MBH (FIG. 4). Specifically, using the OpenFlow 1.0 API [6], the 16-bit VLAN identifier field can be used for λ-flow mapping, while the 16-bit vendor-specific Action field can be populated with additional sub-λ parameters, such as the OFDMA MBH subcarrier frequencies and modulation formats. By tracking these values, the SD λ-planner can minimize sub-λ frequency overlap between OFDMA MBH and 10 Gb/s OOK flows. For 150 Mb/s per-cell OFDMA MBH over 1:64 split PON and 20% forward error correction (FEC) overhead, a 12 Gb/s OFDMA signal (3 GHz with 16-QAM symbol mapping) is sufficient, and can be output at >10 GHz sub-λ frequencies by the OFDMA Tx to reduce OOK/OFDMA spectral overlap. At the filterless SD 10 G ONUs, the OFDMA signal will thus land outside of the 10 G Rx front-end, which will intrinsically act as a low-pass filter for OFDMA MBH; signal-signal beating of the OFDMA subcarriers will however fall within the 10 G Rx passband (FIG. 4i), effectively behaving as additional noise to be handled via FEC. Each filterless direct detection SD MBH ONU will detect both OFDMA and 10 G OOK DS signals, but will isolate its designated OFDMA frequencies in DSP, and will handle any remaining interference from 10 G OOK via enhanced FEC. Commercialized hard decision FEC with 20% overhead enables bit error rate (BER) tolerance of $1.1 \times 10^{-2}$ (CI-BCH-4™ eFEC, available at www.vitesse.com), and has been exploited for DSP-based relative intensity noise management in coherent optical access using DBR lasers [8]. For dynamic US λ-flows, OpenFlow-based control is used on the OLT-side flex-grid wavelength selective switch (WSS) to dynamically create pass-bands with variable center frequencies and sizes. Because the pass-bands can be software-reconfigured to track US λ-flows, ONU-side tunable laser requirements can be relaxed without a wide US spectrum; λ×10 Gb/s/λ US transmission could thus be realized in 4×100 GHz using low-cost ONU-side lasers. Finally, no ONU-side optical amplification is used.

3. Experimental Setup and Results

Figure 5:
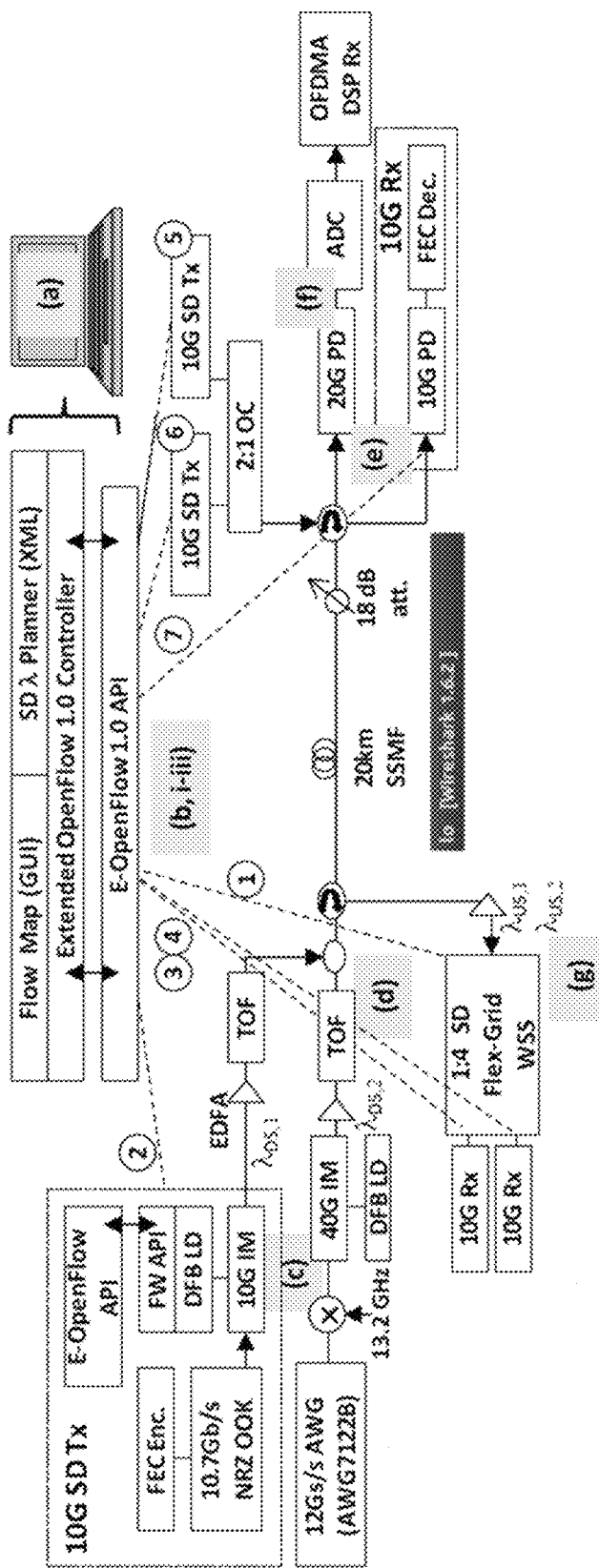
FIGS. 5 and 5(a) to (g) depict an experimental setup of software-defined (SD) E-OpenFlow OFDMA MBH over legacy PON.
Figure 5A:
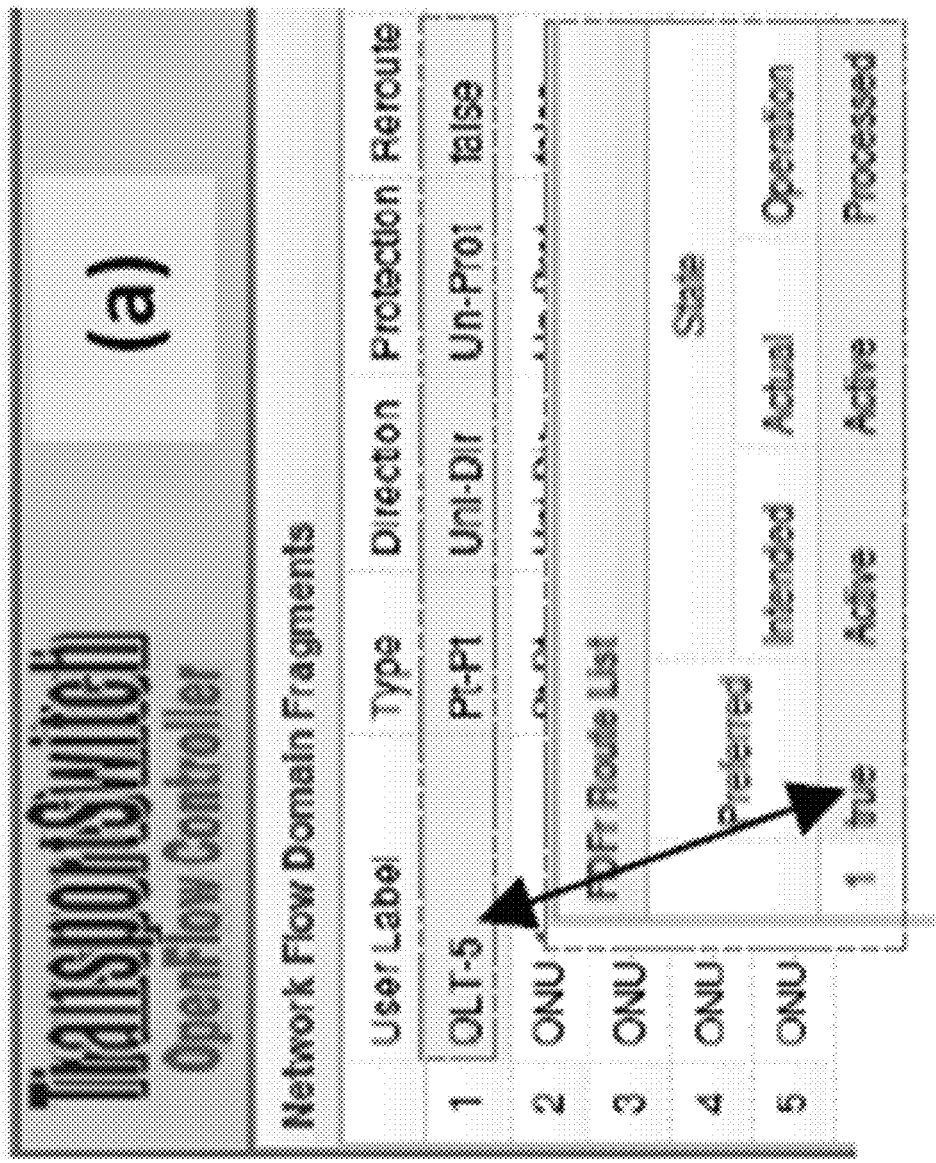
Figure 5B:
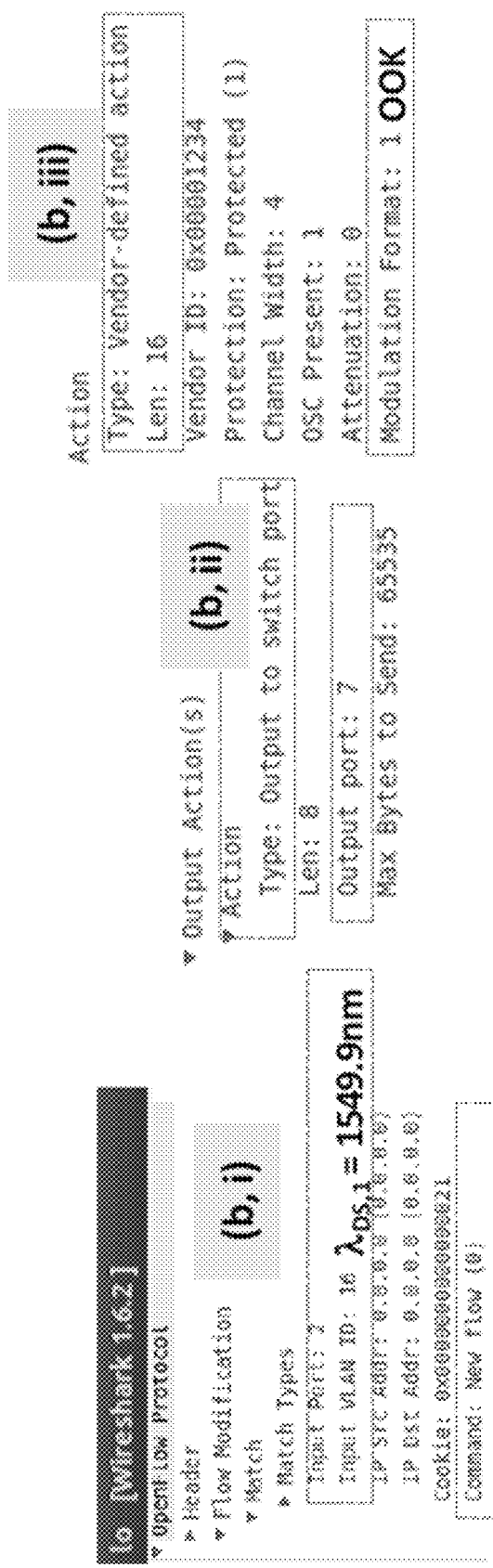
Figure 5C:
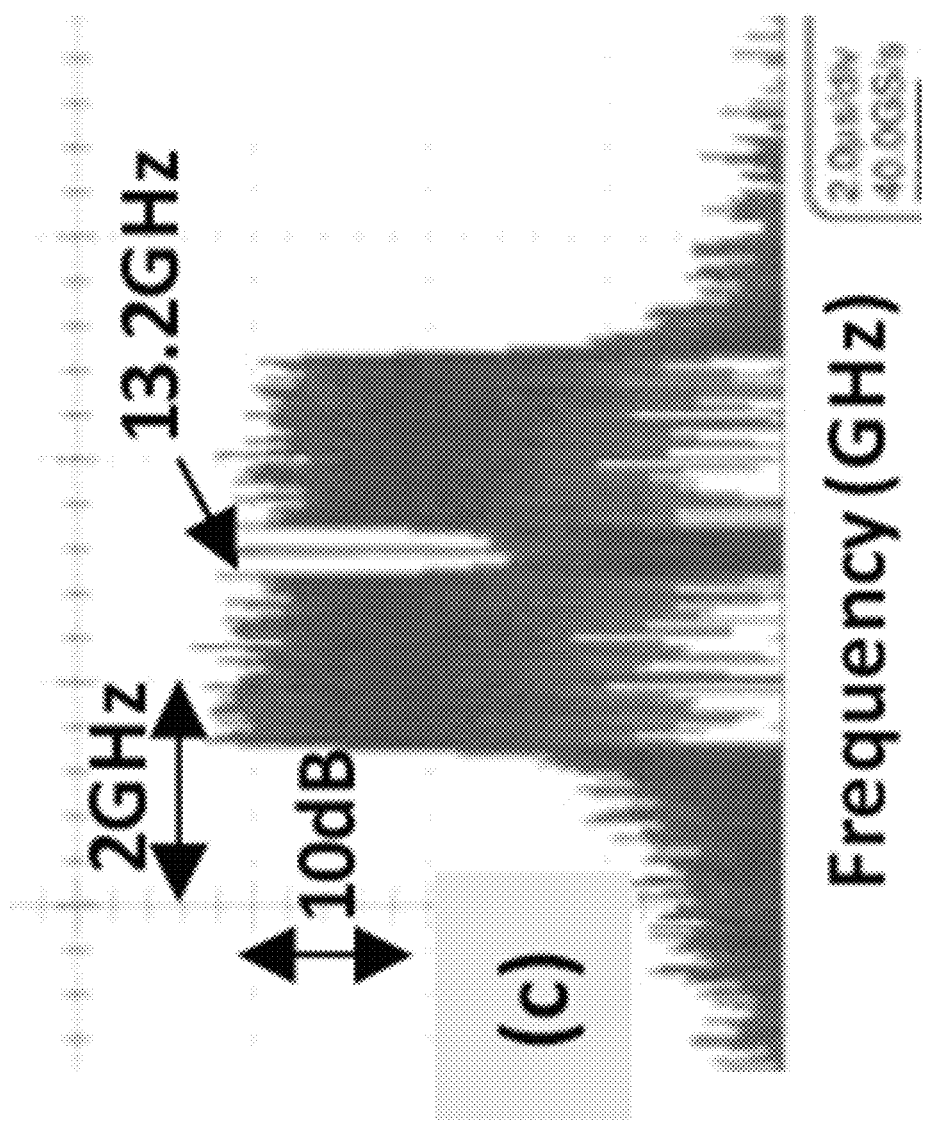
Figure 5D:
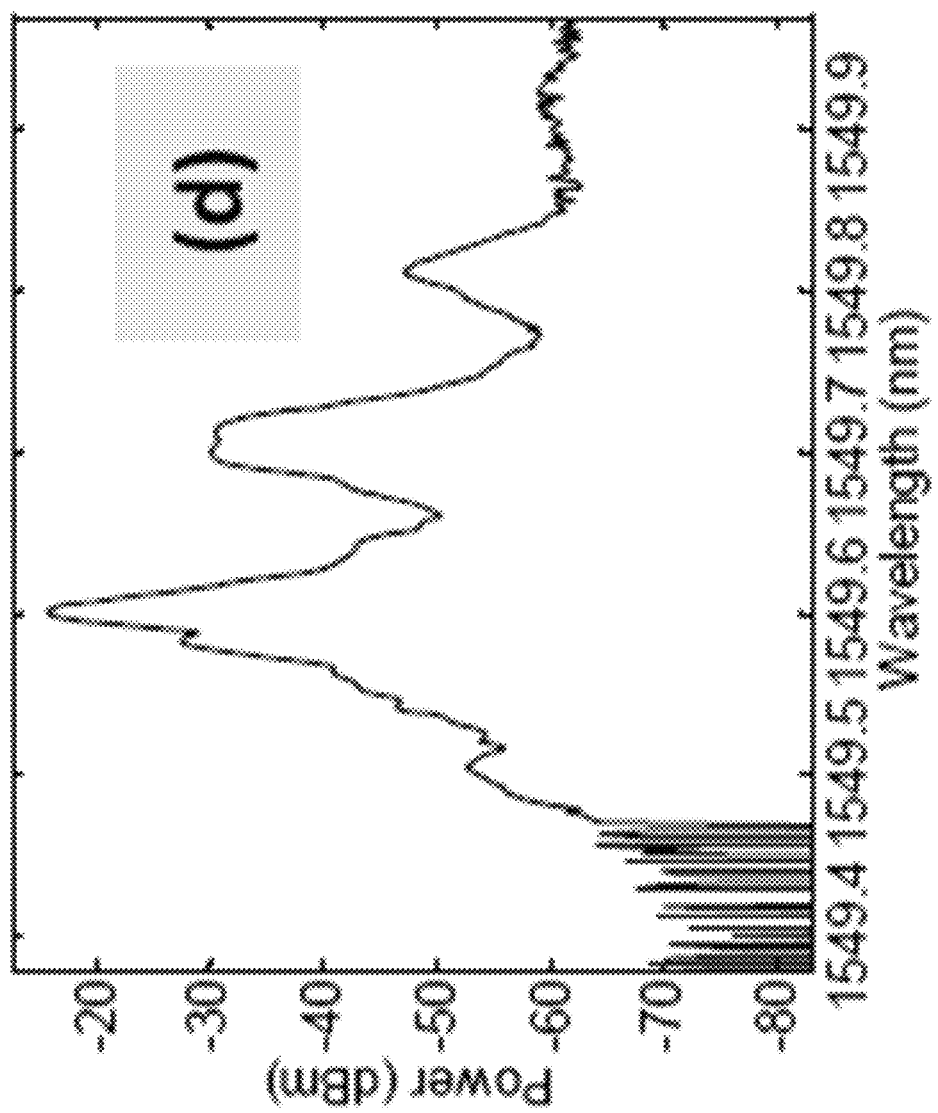
Figure 5E:
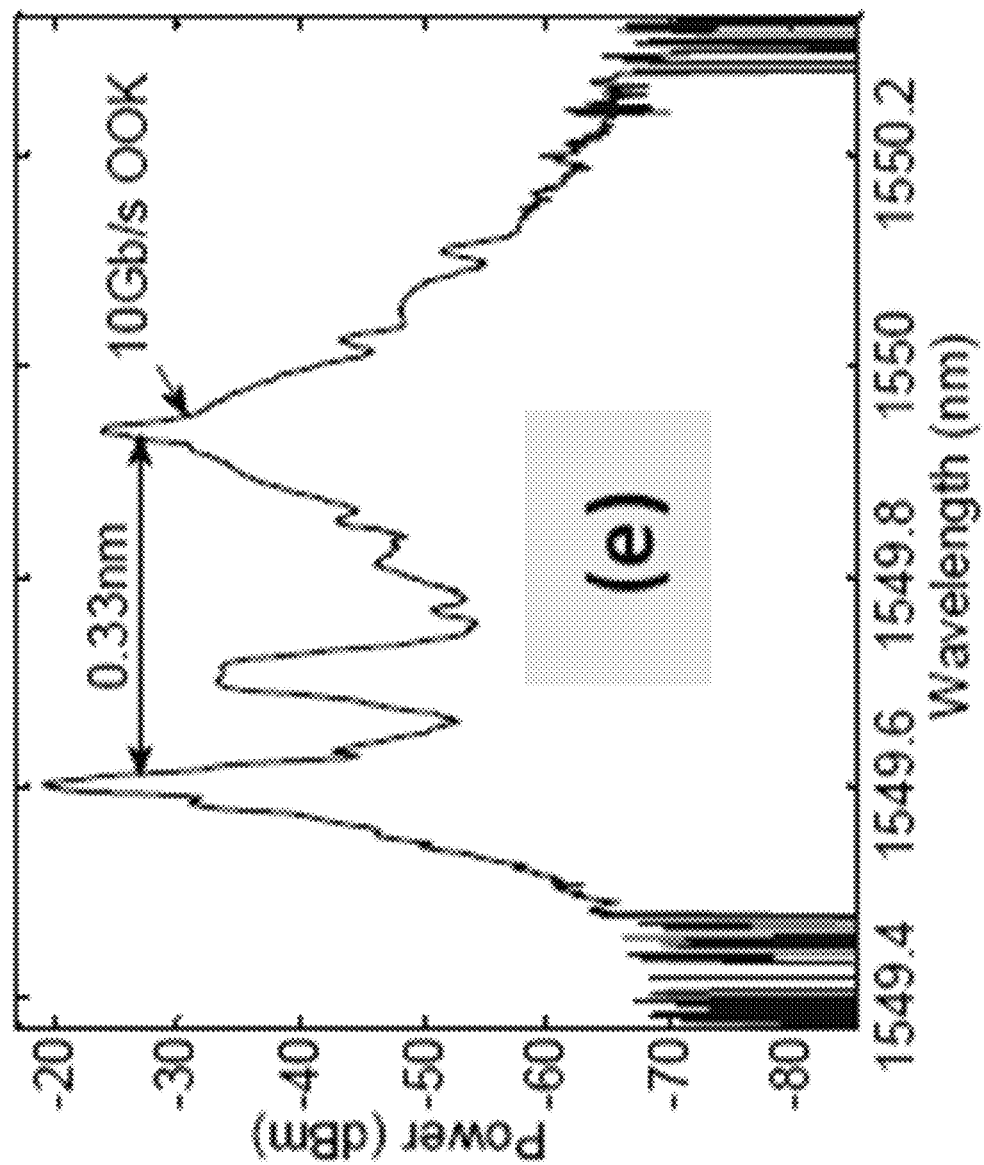
Figure 5F:
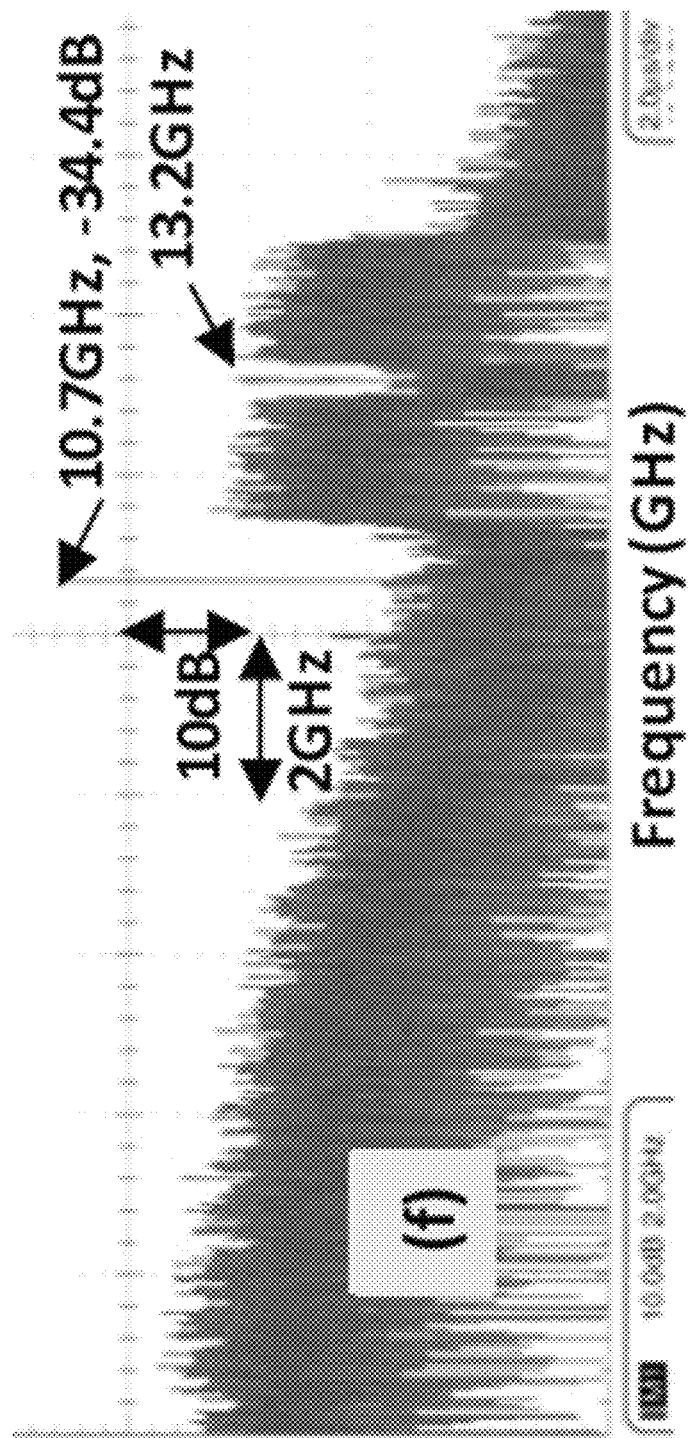
Figure 5G:
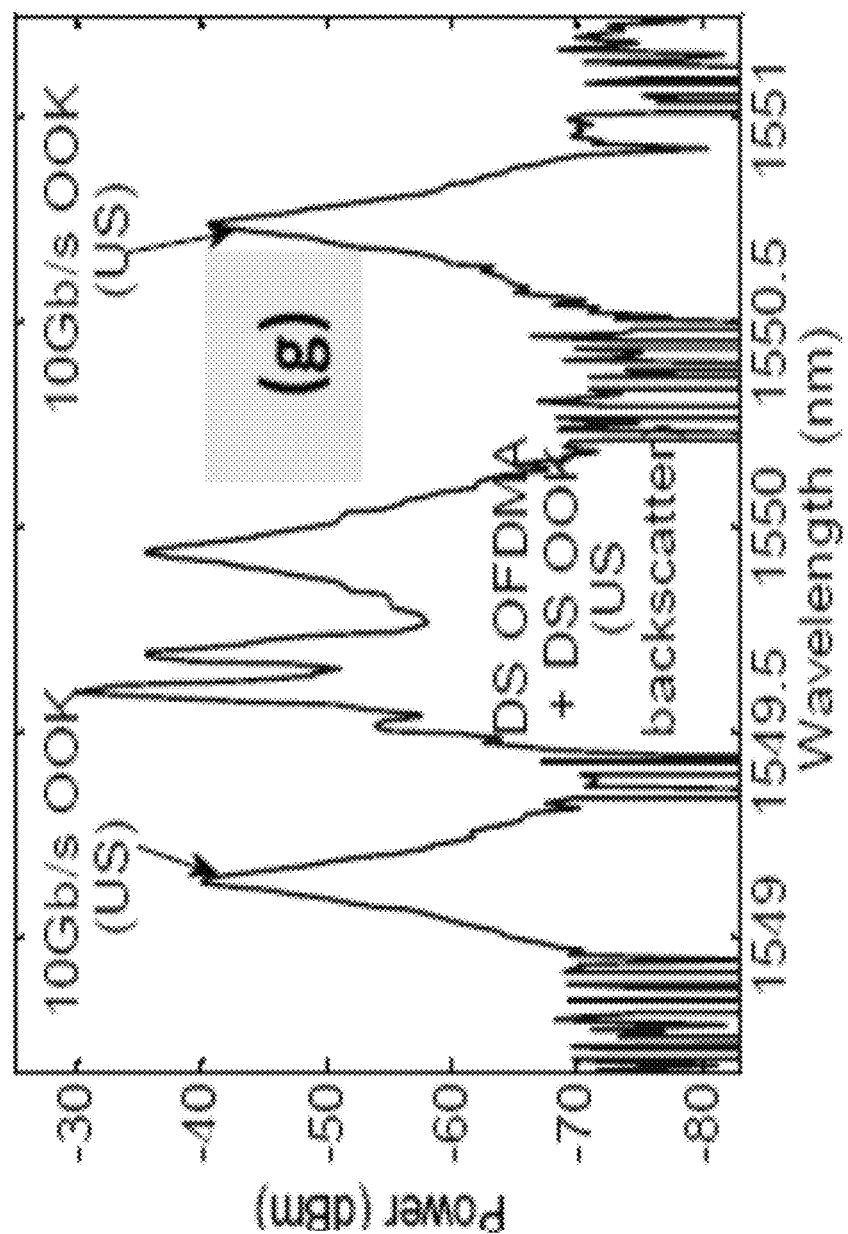

FIG. 5 shows the experimental setup. An out-of-band TCP/Ethernet connection was used to link a PC hosting a flow map GUI, SD λ planner (XML interface), and an extended OpenFlow 1.0 controller and API with 7 OpenFlow ports. Each 10 G SD Tx consisted of a C-band tunable DFB laser, 10.7 Gb/s NRZ OOK encoder, FEC encoder used for BER measurement, and a 10 GHz intensity modulator (IM). DS/US flows between OpenFlow ports were established using the FlowMod( ) command and the VLAN ID field of OpenFlow 1.0 for λ-flow identification. An example is shown in FIG. 5(b,i) for integer-valued VLAN ID=16 matching to $\lambda_{DS,1}$=1549.93 nm at input port 2 and output port 7 [FIG. 5(b,ii)] to create the DS 10 G OOK flow. The vendor-specific action field was used to convey additional parameters, such as the modulation format [FIG. 5(b,iii)]. A 12.75 Gb/s OFDM signal (16-QAM symbol mapping, FFT size of 256, 20% FEC and 7.5% training overhead) was generated offline and output continuously by a 12 GS/s arbitrary waveform generator (AWG), and upconverted to $f_{RF}$=13.2 GHz (FIG. 5c). A tunable DFB laser ($\lambda_{DS,2}$=1549.60 nm in FIG. 5), 40 GHz optical IM and a tunable optical filter were used to create the 7 dBm optical single-sideband OFDMA signal (FIG. 5d), which was passively combined with the DS 10 Gb/s OOK channel (3 dBm launch power) and transmitted over 20 km of SSMF followed by a 1:64 passive split (18 dB attenuation). The flex-grid λ spacing between the DS OFDMA and OOK channels (FIG. 5e) was varied between 41.25 GHz and 141.25 GHz with both signals directly photodetected without receiver-side optical filtering or amplification. A 20 GHz PIN+TIA was used for OFDMA photodetection (FIG. 5f), followed by digitization using a 40 GS/s real-time scope and off-line processing to compute BER based on 0.25M measured bits. Only digital filtering (no analog RF pre-filtering) was used to remove the OOK signal and 10.7 GHz clock tone from the OFDMA spectrum of FIG. 5f. Two US 10 Gb/s OOK signals were passively combined with 100 GHz spacing, with a 1:4 flex-grid WSS software-configured to create a tunable 50 GHz slot for US signal reception (FIG. 5g). The BER for each US channel was measured with the FEC decoder of each SD 10 G Rx (7% overhead, FEC limit BER=$3\times10^{-3}$) based on $6\times10^{11}$ bits.

Figure 6:
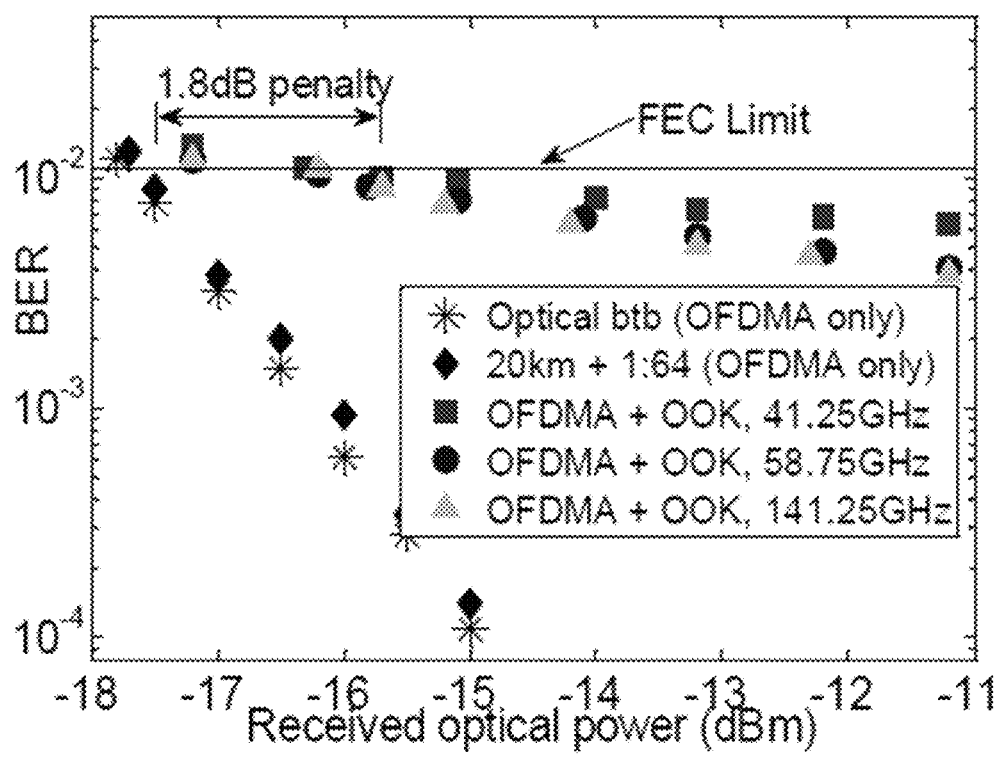
FIG. 6 depicts a downstream (DS) bit error rate (BER) in OFDMA.
Figure 7:
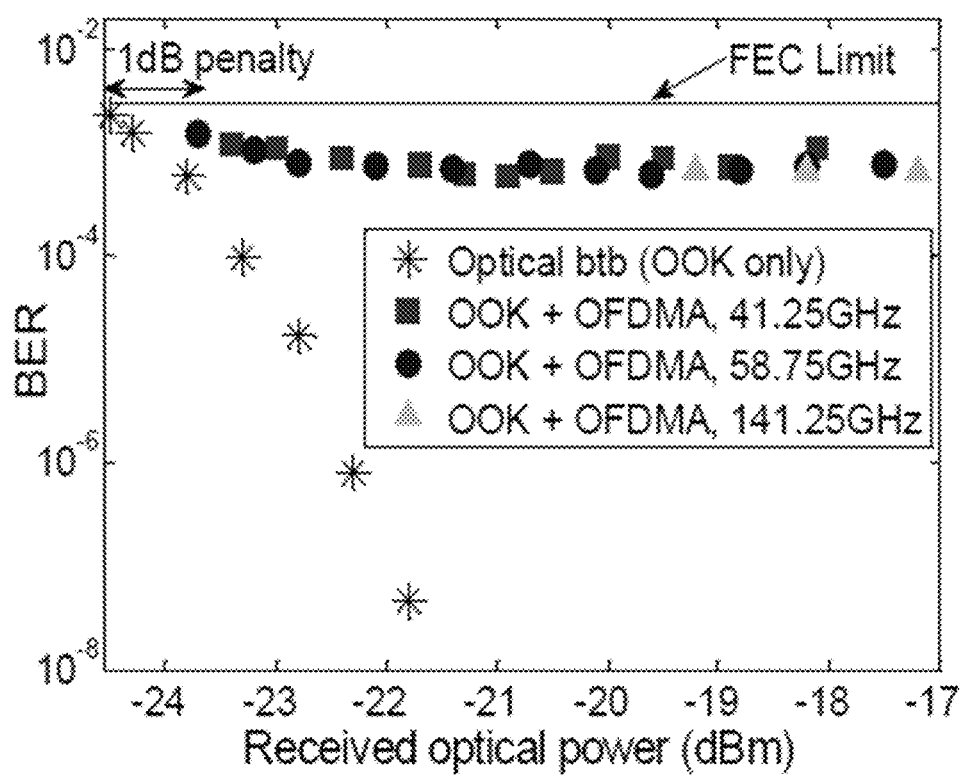
FIG. 7 depicts a downstream (DS) bit error rate (BER) in 10 Gb/s on off keying (OOK).
Figure 8:
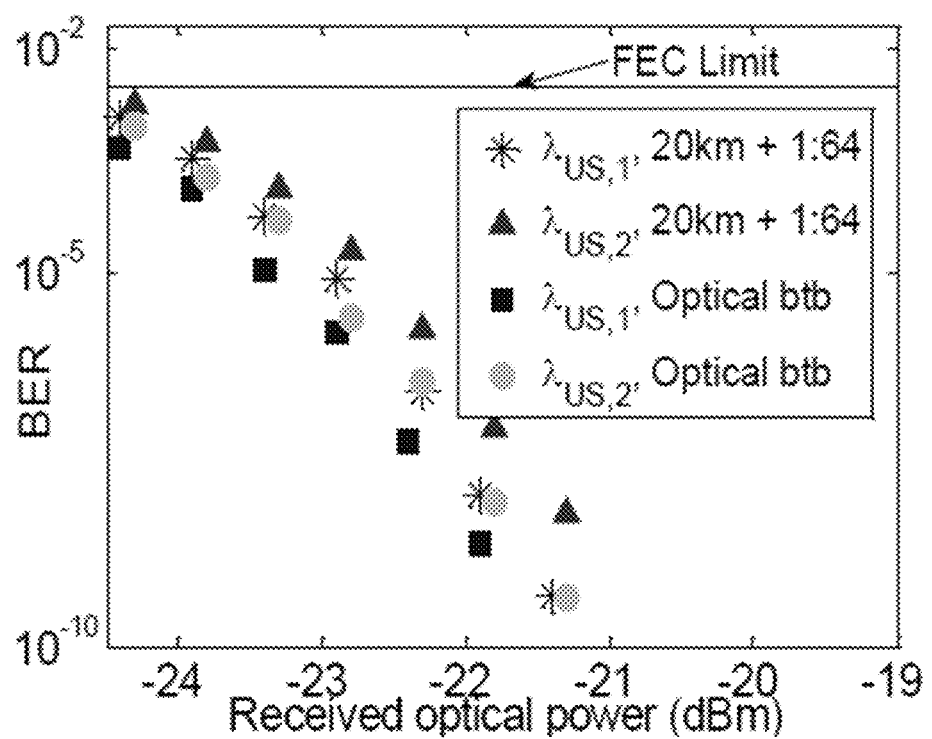
FIG. 8 depicts an upstream (US) bit error rate (BER) in 2×10 Gb/s on off keying (OOK).

FIGS. 6, 7, and 8 plot the measured BER for 12.75 Gb/s DS OFDMA, 10 Gb/s DS OOK, and 2×10 Gb/s US OOK, respectively, for the SD OpenFlow setup of FIG. 5. As shown by FIG. 6, for DS OFDMA, there was virtually no penalty between optical back-to-back (btb) and fiber transmission, while the addition of the DS 10 Gb/s OOK channel imposed a 1.8 dB penalty at the FEC limit (BER=$1.1\times10^{-2}$) for all three flex-grid λ spacings (41.25 GHz, 58.75 GHz, 141.25 GHz). FIG. 6 also confirms −15.7 dBm OFDMA receiver sensitivity corresponding to a 22.7 dB power budget. As shown in FIG. 7, for DS 10 Gb/s OOK, the FEC limit was achieved at −23.5 dBm received power for all three flex-grid λ cases, corresponding to a 1 dB penalty with respect to optical back-to-back and to a 26.5 dB power budget. The saturation of the OFDMA+OOK BER curves in both FIGS. 6 and 7 is directly attributed to mutual interference between the two signals, which increases with increasing received power but showed only minor dependence on λ spacings ≥41.25 GHz. The US BER results are shown in FIG. 8, confirming −24.5 dBm receiver sensitivities for $\lambda_{US,1}$ and $\lambda_{US,2}$ for both back-to-back and US fiber transmission, and revealing negligible penalty from the OFDMA and OOK backscatter signal (FIG. 5g), which was successfully removed by the SD flex-grid WSS.

4. Conclusion

To our best knowledge, we have experimentally demonstrated the first software-defined OpenFlow1.0-based flex-grid λ-flow architecture for dynamic 150 Mb/s per-cell 4G OFDMA MBH overlays onto 10 Gb/s PON without ONU-side optical filtering, amplification, or coherent detection, over 20 km SSMF with a 1:64 passive split. By enabling interoperable on-demand spectrum allocation using software-defined control and DSP-based ONU enhancements, the novel approach is promising for future high-speed converged fixed/mobile access networks.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A network apparatus used in an optical network, the network apparatus comprising:
    one or more first tunable and temperature controlled (TTC) lasers;
    one or more transmitters each of which is connected to one of said one or more TTC lasers;
    one or more second TTC lasers;
    one or more digital signal processing (DSP) transponders (TPNDs) each of which is connected to one of said one or more second TTC lasers;
    one or more receivers; a flexible-grid wavelength selective switch (WSS);
    a controller to:
        control said one or more transmitters and said one or more DSP TPNDs via OpenFlow signaling;
        control, via OpenFlow signaling, the WSS to dynamically create pass-bands with variable center frequencies and sizes for dynamic upstream wavelength-flows; and
        control, via OpenFlow signaling, the wavelength of said one or more first TTC lasers and said one or more second TTC lasers, using an extended OpenFlow application programming interface (API) that controls the underlying laser firmware (FW); and
    a flow map graphical user interface to view, query, and modify in software physical downstream (DS) and upstream (US) connections;
    wherein said one or more transmitters defragment an optical access spectrum, and said one or more DSP TPNDs exploit a newly available spectrum, and
    wherein the physical DS and US connections are virtualized as logical flows between bidirectional OpenFlow port identifiers.

2. The network apparatus as in claim 1, wherein the network apparatus comprises a software-defined optical line terminal (OLT).

3. The network apparatus as in claim 1, wherein the optical network comprises an optical access network or a wavelength division multiplexed (WDM) network.

4. The network apparatus as in claim 1, wherein the flexible-grid WSS is connected to said one or more receivers and wavelength-separates an US optical signal.

5. The network apparatus as in claim 1, further comprising:
    at least one of a wavelength division multiplexed (WDM) combiner and a passive optical coupler,
    wherein said at least one of the WDM combiner and a passive optical coupler is connected to said one or more first TTC lasers and combines DS wavelengths.

6. The network apparatus as in claim 1, wherein said one or more receivers include a burst-mode optical receiver for a time division multiplexing (TDM)-based service with a data rate up to 10 Gb/s/λ.

7. The network apparatus as in claim 1, wherein said one or more receivers include a coherent detection receiver for a service with a data rate beyond 10 Gb/s/λ.

8. The network apparatus as in claim 1, wherein the controller controls said one or more transmitters and said one or more DSP TPNDs with dynamic wavelength assignment algorithm.

9. The network apparatus as in claim 1, wherein the controller controls said one or more transmitters and said one or more DSP TPNDs with wavelength virtualization mapping.

10. The network apparatus as in claim 1, wherein the graphical user interface includes a virtual view of a wavelength space.

11. The network apparatus as in claim 1, wherein the network apparatus is connected to an optical network unit (GNU) through an optical fiber.

12. The network apparatus as in claim 1, wherein the controller comprises a centralized controller.

13. A method used in an optical network, the method comprising: controlling, via OpenFlow signaling, one or more transmitters each of which is connected to a first tunable and temperature controlled (TTC) laser and one or more digital signal processing (DSP) transponders (TPNDs) each of which is connected to a second TTC laser;

controlling, via OpenFlow signaling, a flexible-grid wavelength selective switch (WSS) to dynamically create pass-bands with variable center frequencies and sizes for dynamic upstream wavelength-flows;

controlling, via OpenFlow signaling, the wavelength of said one or more first TTC lasers and said one or more second TTC lasers, using an extended OpenFlow application programming interface (API) that controls the underlying laser firmware (FW); and at least one of viewing, querying, and modifying in software physical downstream (DS) and upstream (US) connections on a flow map graphical user interface;

wherein said one or more transmitters defragment an optical access spectrum, and said one or more DSP TPNDs exploit a newly available spectrum, and wherein the physical DS and US connections are virtualized as logical flows between bidirectional OpenFlow port identifiers.

14. The method as in claim 13, wherein said one or more transmitters and said one or more DSP TPNDs are controlled via control signaling comprising five 16-bit fields.

15. The method as in claim 14, wherein the five 16-bit fields comprise:
a 16-bit numerical label to an underlying optical wavelength;
sub-wavelength operational frequencies of a signal; and
a modulation format of the signal.

16. An optical network comprising: a network apparatus; an optical network unit connected to the network apparatus through an optical fiber, wherein the network apparatus comprises:
one or more first tunable and temperature controlled (TTC) lasers;
one or more transmitters each of which is connected to one of said one or more TTC lasers;
one or more second TTC lasers;
one or more digital signal processing (DSP) transponders (TPNDs) each of
which is connected to one of said one or more second TTC lasers; one or more receivers; a flexible-grid wavelength selective switch (WSS);
a controller to:
control, via OpenFlow signaling, the wavelength of said one or more first TTC lasers and said one or more second TTC lasers, using an extended OpenFlow application programming interface (API) that controls the underlying laser firmware (FW); and
control, via OpenFlow signaling, the WSS to dynamically create pass-bands with variable center frequencies and sizes for dynamic upstream wavelength-flows; and
one or more flow map graphical user interfaces to view, query, and modify in software physical downstream (DS) and upstream (US) connections;
wherein said one or more transmitters defragment an optical access spectrum, and said one or more DSP TPNDs exploit a newly available spectrum, and
wherein the physical DS and US connections are virtualized as logical flows between bidirectional OpenFlow port identifiers.

17. The network apparatus as in claim 1, wherein said one or more DSP TPNDs communicate by optical orthogonal frequency division multiple access (optical OFDMA) signaling for coexistence with baseband on off keying (OOK) transmission.

* * * * *